(12) United States Patent
Shampine et al.

(10) Patent No.: US 7,600,564 B2
(45) Date of Patent: Oct. 13, 2009

(54) COILED TUBING SWIVEL ASSEMBLY

(75) Inventors: Rod Shampine, Houston, TX (US);
Vishal Saheta, Houston, TX (US);
Matthew E. Wilson, Eureka, KS (US)

(73) Assignee: Schlumberger Technology Corporation, Sugar Land, TX (US)

( * ) Notice: Subject to any disclaimer, the term of this patent is extended or adjusted under 35 U.S.C. 154(b) by 115 days.

(21) Appl. No.: 11/323,684

(22) Filed: Dec. 30, 2005

(65) Prior Publication Data
US 2007/0151721 A1 Jul. 5, 2007

(51) Int. Cl.
*E21B 19/00* (2006.01)

(52) U.S. Cl. ............ 166/90.1; 166/77.2; 239/195; 239/197

(58) Field of Classification Search .......... 166/90.1, 166/77.2; 239/195, 196, 197, 198
See application file for complete search history.

(56) References Cited

U.S. PATENT DOCUMENTS

| 990,946 | A | | 5/1911 | Badger | |
|---|---|---|---|---|---|
| 1,325,113 | A | | 12/1919 | Rohn | |
| 1,452,603 | A | | 4/1923 | Himes | |
| 1,868,497 | A | * | 7/1932 | Clement et al. | 137/234.6 |
| 2,701,146 | A | | 2/1955 | Warren | |
| 3,009,367 | A | * | 11/1961 | Striggow | 74/424.86 |
| 3,287,801 | A | * | 11/1966 | Blenkarn | 29/460 |
| 3,360,049 | A | * | 12/1967 | Kisling, III | 166/123 |
| 3,762,782 | A | * | 10/1973 | Rumbarger | 384/92 |
| 4,296,952 | A | * | 10/1981 | McCracken | 285/98 |
| 4,418,947 | A | | 12/1983 | Talafuse | |
| 4,753,291 | A | | 6/1988 | Smith et al. | |
| 4,945,938 | A | * | 8/1990 | Ponsford et al. | 137/15.01 |
| 5,215,151 | A | * | 6/1993 | Smith et al. | 175/45 |
| 5,328,040 | A | * | 7/1994 | Morrow | 212/253 |
| 5,415,441 | A | | 5/1995 | Kilgore et al. | |
| 5,787,923 | A | | 8/1998 | Shea | |
| RE36,556 | E | * | 2/2000 | Smith et al. | 175/45 |
| 6,029,695 | A | | 2/2000 | Logan | |
| 6,164,707 | A | | 12/2000 | Ungchusri | |
| 6,637,454 | B1 | | 10/2003 | Eley | |
| 2003/0006034 | A1 | | 1/2003 | Neal | |
| 2003/0192688 | A1 | * | 10/2003 | Thomson et al. | 166/78.1 |
| 2004/0035572 | A1 | | 2/2004 | Cooper | |
| 2004/0146232 | A1 | * | 7/2004 | Buchanan et al. | 384/513 |

FOREIGN PATENT DOCUMENTS

| CA | 2273753 | * | 6/1999 |
|---|---|---|---|
| GB | 174917 | | 3/1922 |
| GB | 263458 | | 12/1926 |
| GB | 2381814 | | 5/2003 |
| GB | 2394495 | | 4/2004 |

* cited by examiner

*Primary Examiner*—David J Bagnell
*Assistant Examiner*—Sean D Andrish
(74) *Attorney, Agent, or Firm*—Rodney Warfford; David Cate; Robin Nava

(57) ABSTRACT

A coiled tubing swivel assembly is provided that includes a mandrel for attachment to a pump, and a hub rotatably attached to the mandrel and for attachment to an end of a string of coiled tubing. The mandrel and the hub together form a conduit for passage of a pumped substance. A crane bearing is attached to the fluid conduit.

19 Claims, 5 Drawing Sheets

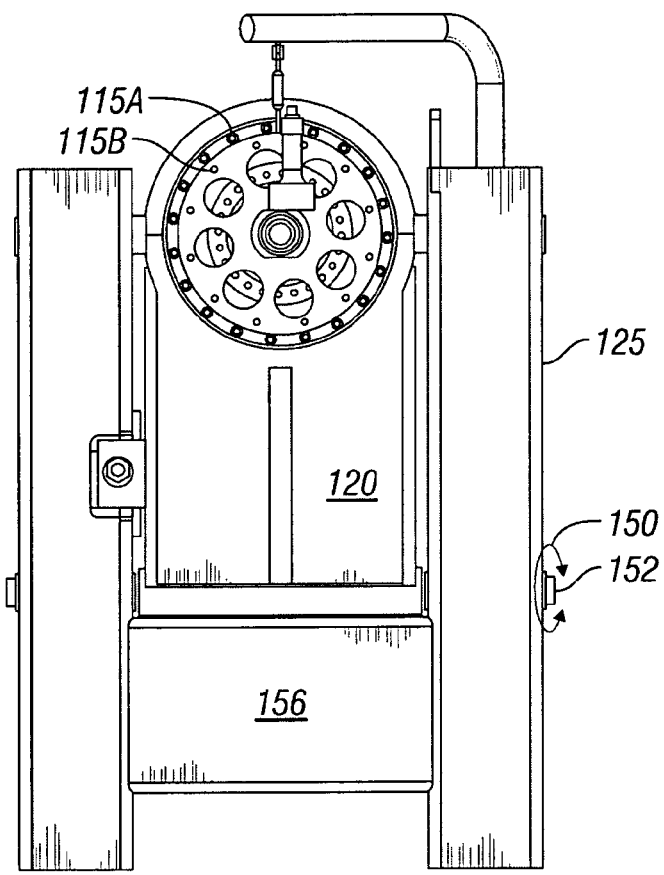
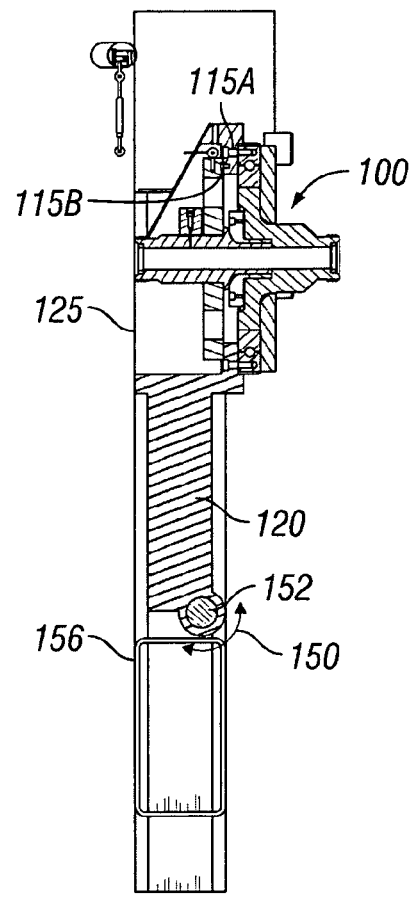
FIG. 5A
FIG. 5B
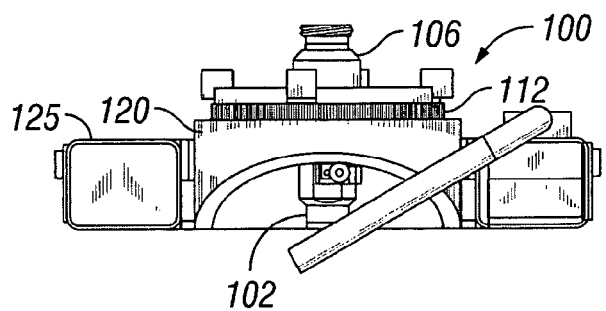
FIG. 5C

COILED TUBING SWIVEL ASSEMBLY

FIELD OF THE INVENTION

The present invention relates generally to a coiled tubing swivel assembly, and particularly to a coiled tubing swivel assembly having a crane bearing as defined herein.

BACKGROUND

Coiled tubing is used for a wide range of oil well operations, such as drilling, logging, cleanouts, fracturing, cementing, under reaming, fishing, completion, and production operations, among other operations.

A coiled tubing string is typically wrapped around a reel and dispensed onto and off of the reel during an operation. One end of the coiled tubing string extends from the reel to an injector. The injector moves the coiled tubing string into and out of a wellbore. An opposite end of the coiled tubing string is connected, through a coiled tubing swivel, to fluid and/or gas pumps, that pump fluid and/or gas substances through the coiled tubing string during a desired oil well operation. This opposite end of the coiled tubing string rotates along with the coiled tubing reel when the coiled tubing string is dispensed onto and off of the reel.

As such, the coiled tubing swivel is required to provide a high pressure rotating connection between the coiled tubing string and the fluid and/or gas pumps to allow pumped substances to be transferred therebetween. The coiled tubing swivel is typically required to seal: dry gases (such as Nitrogen), liquids (such as water, brine, acid, alcohol, and solvents), foams, and solid suspensions (such as fracturing fluids and jet cleaning materials).

FIG. 1 shows a coiled tubing swivel 10 according to the prior art. As shown, the coiled tubing swivel 10 includes a mandrel 12 for connection to fluid and/or gas pumps, and a hub 14 for connection to a coiled tubing string. As is typical with coiled tubing swivels of the prior art, the depicted swivel 10 includes a right angle turn or an elbow 16. Such coiled tubing swivels wear out very rapidly at the elbow 16 when solids, such as sand, are pumped therethrough.

As shown, the hub 14 includes a first section 18 screw fastened to a second section 20. Before assembly with the hub, a packing 22 and ball bearing assemblies 24 are attached to the outer diameter of the mandrel 12. The ball bearing assemblies 24 each contain an inner ring 26 and an outer ring 28, with spherical bearings 30 disposed therebetween. The ball bearing assemblies 24 are press fit onto the outer diameter of the mandrel 12, and must be precisely aligned both parallel to the mandrel axis and concentric with the mandrel axis. If either ball bearing assembly 24 is misaligned in either of these respects, it will wear and/or fail quickly.

After the packing 22 and ball bearing assemblies 24 have been assembled on the mandrel, the mandrel 12 is inserted into the hub first section 18, and the hub second section 20 is screw fastened to the hub first section 18 to secure the mandrel 12 to the hub 14.

A problem with the above-described coiled tubing swivel 10 is that any replacement of the mandrel 12 requires reinstallation of the ball bearing assemblies 24. Due to the precision required and other difficulties associating with installing the ball bearing assemblies 24 on the mandrel 12 such a replacement of the mandrel 12 becomes a very time consuming process.

Also in order to allow the packing 22 to rotate with respect to the mandrel 12, a coating is applied to the mandrel 12 to create a slick, sliding surface. During use, this coating is placed in tension due to the internal pressure in the mandrel 12 caused by a pumped substance flowing therethrough. This tensioning of the coating can lead to cracks forming therein due to the mismatch in elastic moduli between the mandrel 12 and the coating. These cracks form sites for crevice corrosion, leading to disengagement of the coating from the mandrel 12 and failure in the packings 22. In some prior art swivels this coating has a coefficient of thermal expansion, which is substantially different from the mandrel to which it is applied, and the application of the coating to the mandrel is done at high temperatures. These factors also act to create tension on the coating during use.

FIG. 2 shows an enlarged and slightly exaggerated cross sectional view of a portion of the ball bearing assembly 24 of FIG. 1. As shown, the inner and outer rings 26 and 28 of the ball bearing assembly 24 contain facing races 25 which substantially trace the outer diameter of the spherical bearings 30. However, each race 25 has a side 27 that is thicker, or extends further around the spherical bearings 30, than the other side 29. Also, the ball bearing assembly 24 will not function properly unless the thicker side 27 of the outer ring's race is disposed caddy-corner from the thicker side 27 of the inner ring's race. Thus, creating the possibility of an improper installation of the ball bearing assemblies 24 on the mandrel 12.

Also, this ball bearing assembly 24 configuration creates a reaction force F, which is good at carrying an axial load A, but poor in carrying radial R, thrust T, and bending moment loads B. In order to adequately carry radial R, thrust T, and bending moment loads B, two or more ball bearing assemblies 24 must be used in combination, preferably adjacently positioned on the mandrel 12 (as shown in FIG. 1), and oriented oppositely such that their reaction forces F are oppositely directed. With the reaction forces F oppositely directed, the ball bearing assemblies 24 can react to a larger variety of forces.

Another problem with this ball bearing assembly 24 configuration is that openings 15 on the sides of the assembly 24 expose the spherical bearings 30 to the outside environment, such as dust and debris. Contamination of the bearings 30 by such debris causes the ball bearing assembly 24 to wear and/or fail quickly. Accordingly, a need exists for an improved coiled tubing swivel assembly.

SUMMARY

In one embodiment, the present invention is a coiled tubing swivel assembly that includes a mandrel for attachment to a pump, and a hub rotatably attached to the mandrel and for attachment to an end of a string of coiled tubing. The mandrel and the hub together form a conduit for passage of a pumped substance. A crane bearing is attached to the fluid conduit.

In another embodiment, the present invention is a coiled tubing swivel assembly that includes a mandrel for attachment to a pump, and a hub rotatably attached to the mandrel and for attachment to an end of a string of coiled tubing. The mandrel and the hub are axially aligned and together form a conduit for passage of a pumped substance. A slewing ring is attached to the fluid conduit, and includes bearing races and a bearing having four points of contact with the bearing races.

In yet another embodiment, the present invention is an assembly that includes a pump; a string of coiled tubing attached to a coiled tubing reel; and a coiled tubing swivel assembly. The swivel assembly includes a mandrel attached to the pump, and a hub rotatably attached to the mandrel and attached to an end of the string of coiled tubing. The mandrel and the hub together form a conduit for passage of a pumped substance from the pump to the string of coiled tubing. A crane bearing is attached to the fluid conduit.

BRIEF DESCRIPTION OF THE DRAWINGS

These and other features and advantages of the present invention will be better understood by reference to the following detailed description when considered in conjunction with the accompanying drawings wherein:

FIGS. 5A-5C show side, side cross-sectional, and top views, respectively, of the coiled tubing swivel of FIG. 3 attached to a mounting device.

DETAILED DESCRIPTION OF EMBODIMENTS OF THE INVENTION

As shown in FIGS. 3-5C, embodiments of the present invention are directed to a coiled tubing swivel assembly. In one embodiment, the coiled tubing swivel assembly includes a crane bearing assembly, having a much greater load bearing capacity than the ball bearing assemblies used on the coiled tubing swivel assembly of the prior art discussed above. In another embodiment, the coiled tubing swivel assembly according to the present invention includes a mandrel that may be replaced without the need to disassemble the associated bearing assembly, thus decreasing the time associated with replacing the mandrel. In yet another embodiment, the swivel assembly mandrel includes a coating that is pre-stressed such that it is in compression when attached to the mandrel, thus reducing the possibility of the formation of cracks in the coating during the pumping of substances through the swivel assembly.

Figure 3:
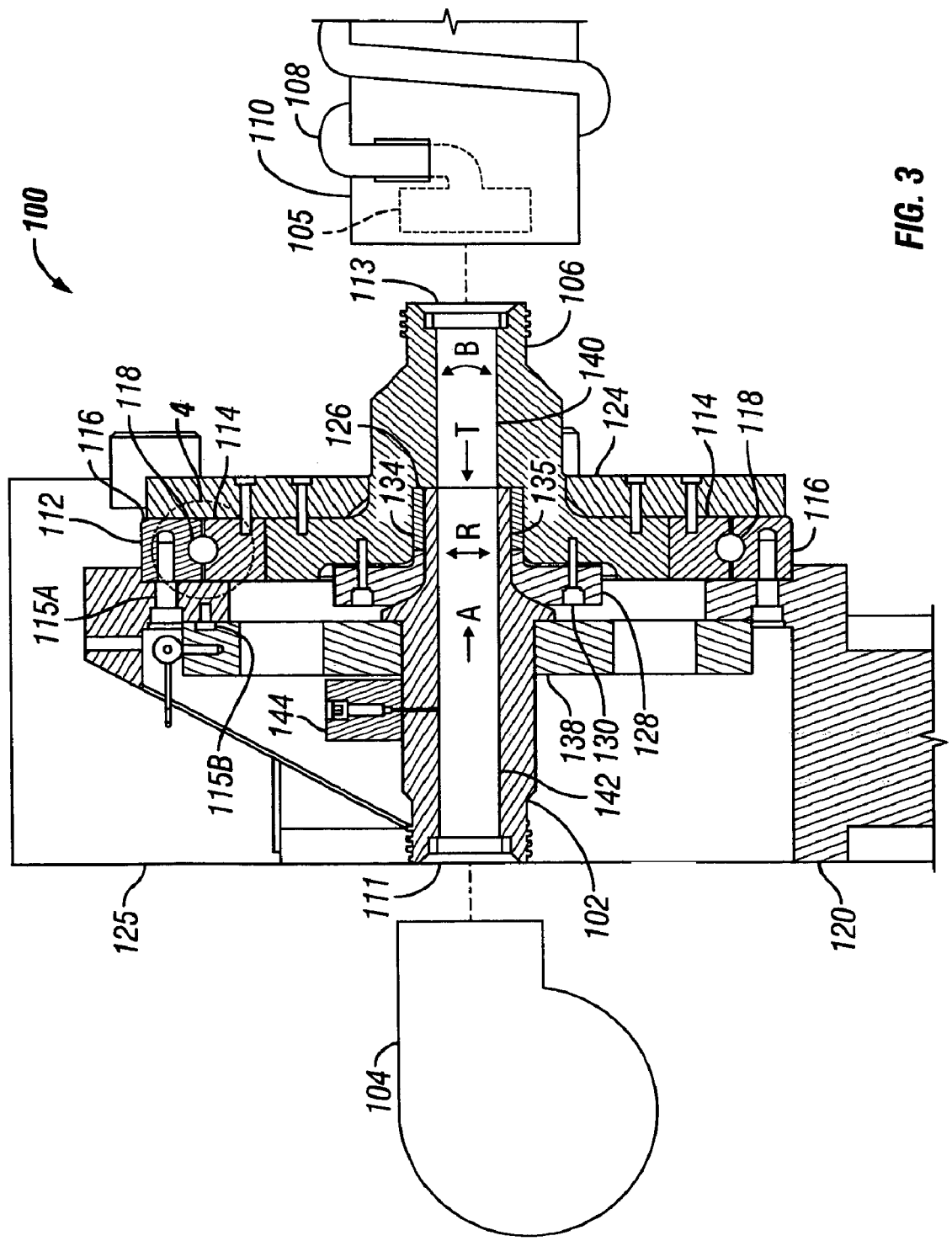
FIG. 3 is a side cross-sectional view of a coiled tubing swivel according to an embodiment of the present invention.

FIG. 3 shows a coiled tubing swivel assembly 100 according to one embodiment of the present invention. The swivel assembly 100 includes a mandrel 102 for connection to fluid and/or gas pumps 104 (hereinafter pumps), and a hub 106 for connection to a first end 105 of coiled tubing string 108, which is held on a reel 110. An opposite end (not shown) of the coiled tubing string 108 extends from the reel 110 to an injector (not shown), which moves the coiled tubing string 108 into and out of a wellbore. [Note that the pumps 104, the coiled tubing string 108, and the coiled tubing reel 110 are each shown schematically in FIG. 3 so that the coiled tubing swivel 100 may be enlarged and shown in more detail.]

The first end 105 of the coiled tubing string 108 rotates along with the coiled tubing reel 110 when the coiled tubing string 108 is dispensed onto and off of the reel 110. As such, the coiled tubing swivel 100 is required to provide a high pressure rotating connection between the first end 105 of the coiled tubing string 108 and the fluid and/or gas pumps 104 in order to allow fluids and/or gases to be pumped from the pumps 104, through the coiled tubing string 108, and into a wellbore during various desired oil well operations.

As shown in FIG. 3, a crane bearing 112 is attached by press fitting an inner surface of the bearing 112 to an outer surface of the hub 106. The crane bearing 112 includes an inner ring 114 and an outer ring 116 having facing races (see FIG. 4 and the accompanying description for further details on the races) which together receive spherical bearings 118, allowing the inner ring 114 to rotate with respect to the outer ring 116.

The outer ring 116 is attached to a swing arm 120, for example by a fastener 115A. The swing arm 120 is pivotally attached to a swivel mounting device 125 as shown in FIGS. 5A-5C and discussed in further detail below. A dogplate 124 is attached to both the inner ring 114 and the hub 106, allowing the inner ring 114 and the hub 106 to rotate together.

A packing 126, such as any appropriate dynamic seal, is attached to an outer surface of an end of the mandrel 102. The packing containing end of the mandrel 102 is then inserted into a bore 134 in an end of the hub 106. In one embodiment, the outer surface of the mandrel 102 includes a coating 135. The coating 135 decreases the friction on the mandrel 102, increases the wear life of the mandrel 102, and creates a slick, sliding surface upon which the packing 126 may rotate.

A packing retainer 128 is attached to the hub 106, for example at attachment location 130, to secure the packing 126 between the mandrel 102 and the hub 106. A mandrel retainer 138 is attached to the swing arm 120, for example by a fastener 115B, to secure the mandrel 102 to the swing arm 120, and hence to the swivel mounting device 125.

Thus assembled, the hub 106 is rotatably connected to the mandrel 102, while the mandrel 102 is stationary with respect to the swivel mounting device 125, allowing the coiled tubing string 108 to rotate when mounted to the swivel assembly 100, while allowing the pumps 104 to remain stationary when mounted to the swivel assembly 100. Also, in the depicted configuration, the hub 106 is axially aligned with the mandrel 102, allowing a pumped substance to flow in a straight line through inner bores 140 and 142, respectively, in the hub 102 and the mandrel 102. For example, in the depicted embodiment, an inlet 111 to the mandrel bore 142 is axially aligned with an outlet 113 to the hub bore 140. In one embodiment, a pressure transducer 144 is attached to the mandrel 102 to measure the internal pressure of the mandrel 102.

Figure 1:
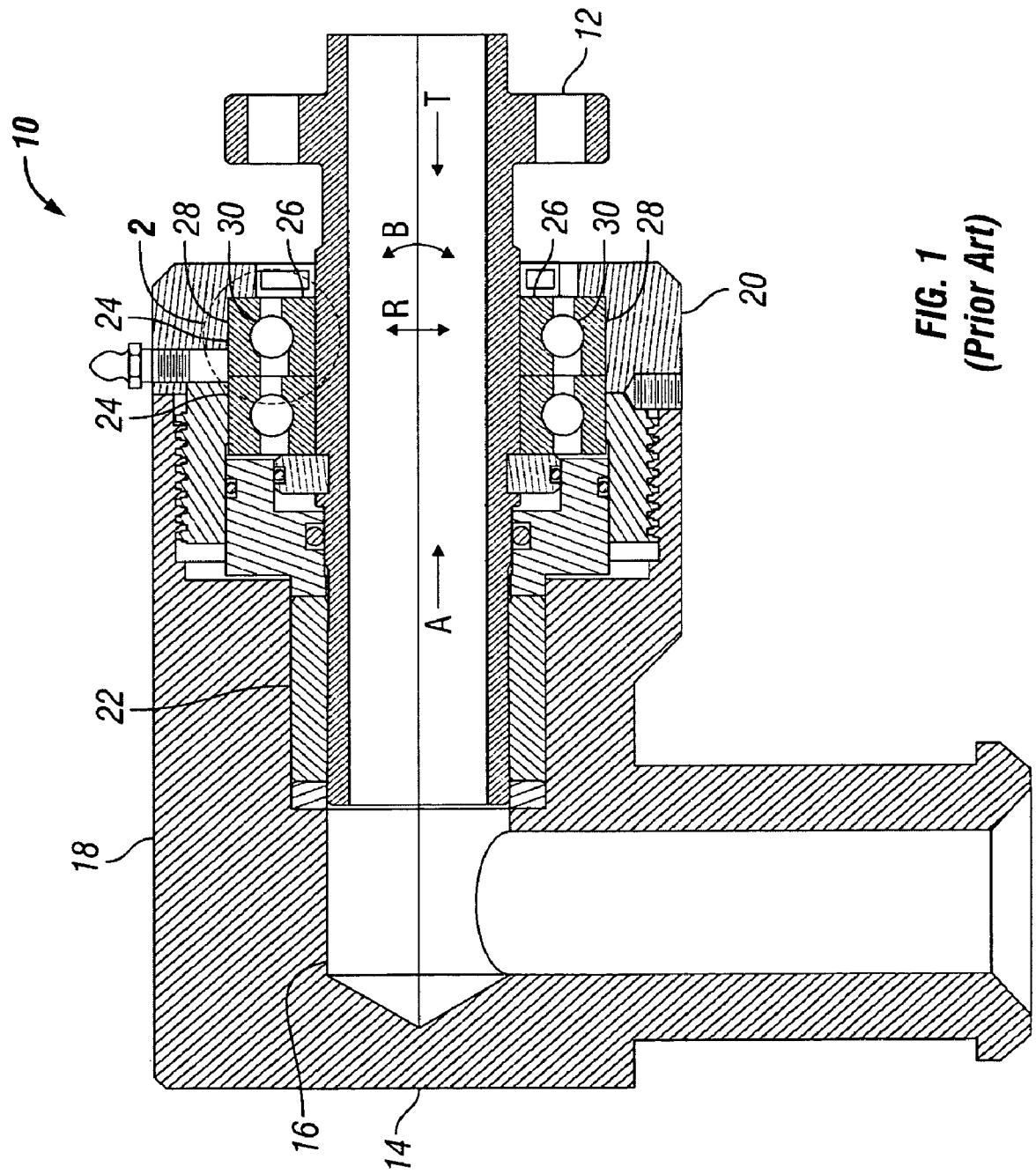
FIG. 1 is a side cross-sectional view of a coiled tubing swivel according to an embodiment of the prior art.
Figure 2:
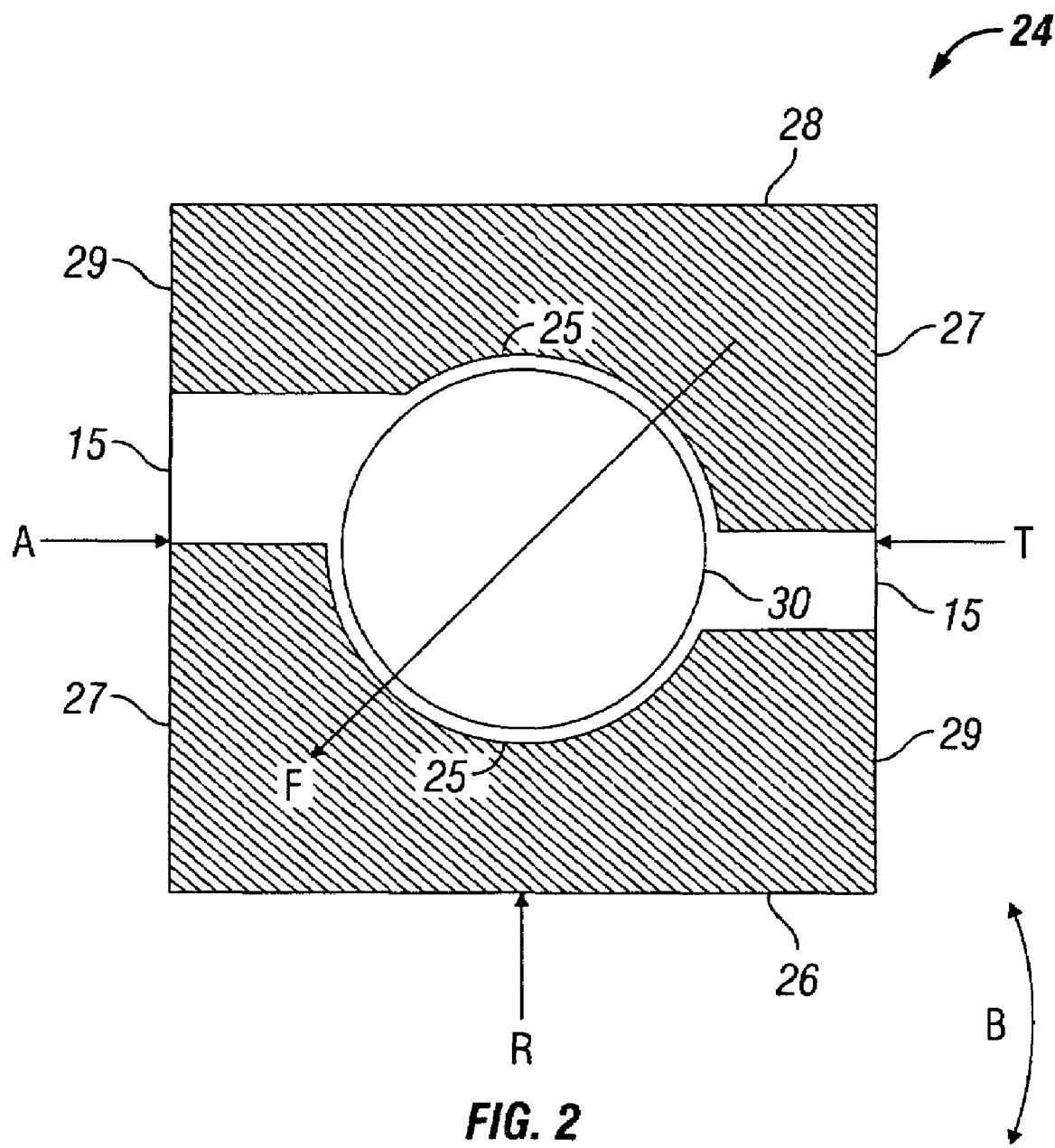
FIG. 2 is taken from detail 2 of FIG. 1, and shows an enlarged and slightly exaggerated cross sectional view of a portion of a ball bearing assembly, which forms part of the prior art coiled tubing swivel of FIG. 1.
Figure 4:
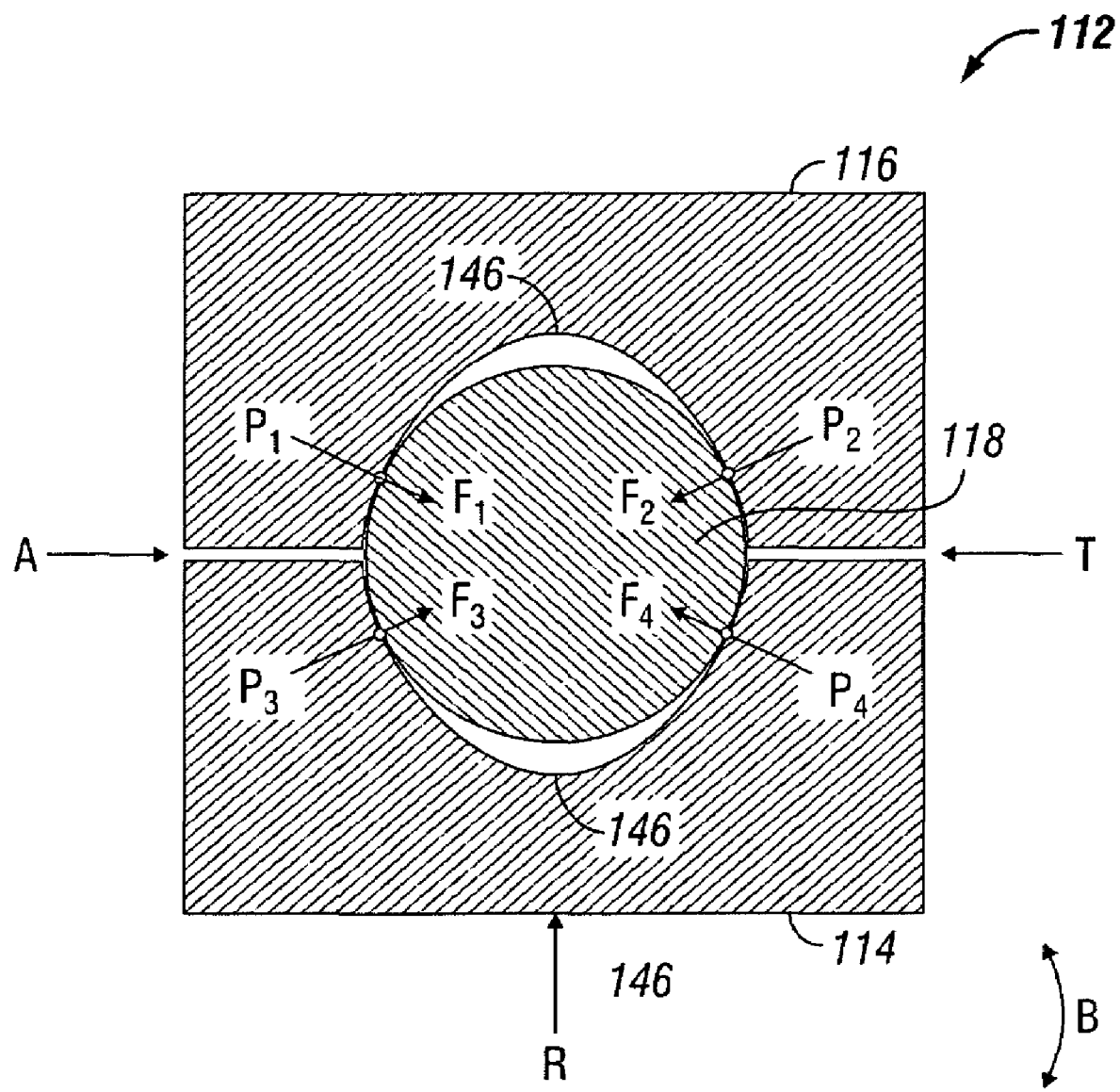
FIG. 4 is taken from detail 4 of FIG. 3, and shows an enlarged and slightly exaggerated cross sectional view of a portion of a ball bearing assembly, which forms part of the coiled tubing swivel of FIG. 3.

FIG. 4 shows an enlarged and slightly exaggerated cross sectional view of the crane bearing 112 of FIG. 3. As shown, the inner and outer rings 114 and 116 of the crane bearing 112 contain facing races 146 which are each slightly larger than the outer diameter of the spherical bearings 118, contained therein, and slightly oblong or oval shaped, also sometimes referred to as a Gothic arch. This configuration allows the spherical bearings 118 to have 4 points of contact ($P_1$-$P_4$) with the races 146. Each of these contact points ($P_1$-$P_4$) produces a differently directed reaction force ($F_1$-$F_4$). As a result, the crane bearing 112 of FIG. 3 has a much larger load carrying capacity than the ball bearing assembly 24 used on the coiled tubing swivel assembly 10 of the prior art discussed above and shown in FIG. 1. As such, in one embodiment, the crane bearing 112 not only supports the pressure loads created by the pumped substances passing through the swivel 100, but also the reel load created by the weight of the coiled tubing reel 108.

In addition, with each of the reaction forces ($F_1$-$F_4$) acting in a different direction, only one crane bearing 112 is needed to carry the radial R, thrust T, and bending moment loads B that are imparted on the coiled tubing swivel 100, whereas the coiled tubing swivel of the prior art described above requires multiple ball bearing assemblies 24 in order to carry the variously directed loads.

As shown in the configuration of FIG. 3, the crane bearing 112 is attached to the hub 106 and is not in direct physical contact with the mandrel 102. As such, when the mandrel 102 and/or the packing 126 needs to be replaced, the crane bearing 112 is not moved, and therefore the timely procedure of resetting of the bearings required by the swivel of the prior art during a mandrel replacement is avoided. With the configuration of the present invention, the mandrel 102 can be replaced in a minimal amount of time. Also, even when the mandrel 102 is removed from the coiled tubing swivel assembly 100, for example during a replacement of the mandrel 102, the hub 103 and crane bearing 112 may remain attached to the coiled tubing 108 in order to support the weight of the coiled tubing. In addition, as shown in FIG. 4, the inner and outer rings 114 and 116 of the crane bearing 112 completely encloses the spherical bearings 118, such that contamination of the spherical bearings 118 by dust and debris is minimized, thus increasing the life of the crane bearing 112.

Although, the above description refers to a crane bearing 112 having a specific configuration, the term crane bearing as used herein encompasses any large bore bearing capable of carrying a combination of axial, radial, and moment loads. Such a bearing may include single or multiple races; spherical balls or rollers (crossed and/or tapered); and two or more sections/rings assembled together. The crane bearing may include any combination of separable races, loading plugs, loading slots, Conrad assembly, or deformation assembly as long as they do not interfere with the bearing's ability to carry the required loads. The crane bearing will preferably be supplied with integral seals and may either have one or more grease fittings or be sealed for life. The crane bearing may be custom made to incorporate one or more of the parts of the swivel assembly into it to reduce the parts count and improve assembly and concentricity. The crane bearing 112 shown in FIGS. 3 and 4 is a slewing ring bearing assembly.

In one embodiment, the mandrel coating 135 of the swivel assembly 100 of FIG. 3 is pre-stressed by pre-heating the swivel mandrel 102 to a specific temperature. The coating 135 is then applied to the mandrel 102. After the coating 135 has solidified, the mandrel 102 and coating 135 are allowed to cool. This places the coating in compression.

The temperature of the pre-heating of the coating 135 may be chosen either such that the coating 135 always remains below its tensile failure limit, or the coating 135 reaches no more than zero compression at the pressure that it is expected to experience during the pumping of desired substances through the swivel assembly 100.

In one embodiment, the coating 135 is chosen, such that its coefficient of thermal expansion is similar to that of the mandrel 102. This allows the coating 135 and the mandrel 102 to expand at similar rates during use of the swivel assembly 100, so that added stress on the coating 135 (which occurs in situations where the coefficients of thermal expansion of the coating and mandrel are very different) is avoided. Also, in one embodiment the coating 135 is composed of a single, homogeneous matrix. Such a matrix increases the wear life of the mandrel 102 to which the coating 135 is applied.

In one embodiment, such as that shown in FIGS. 5A-5C, the coiled tubing swivel assembly 100 is attached to a swivel mounting device 125. The swivel mounting device 125 includes a swing arm 120 to which the swivel assembly 100 is attached as described above. The swing arm 120 is rotatable as shown by arrow 150 about a pivot pin 152. The rotation of the swing arm 120 allows the swivel assembly 100 to be moved closer to or further away from the coiled tubing string 108 and reel 110. In one embodiment, the mounting device 120 includes a mechanical stop 156, which interferes with the rotation of the swing arm 120 in order to limit the rotative movement of the swing arm 120. For example in one embodiment, the stop 156 prevents the swing arm 120 from exceeding an angle of approximately 26° past the vertical, however in other embodiments the stop 156 can allow for any desired angle of rotation.

The preceding description has been presented with reference to presently preferred embodiments of the invention. Persons skilled in the art and technology to which this invention pertains will appreciate that alterations and changes in the described structures and methods of operation can be practiced without meaningfully departing from the principle, and scope of this invention. Accordingly, the foregoing description should not be read as pertaining only to the precise structures described and shown in the accompanying drawings, but rather should be read as consistent with and as support for the following claims, which are to have their fullest and fairest scope.

The invention claimed is:

1. An oilfield assembly comprising a pump connected to a string of coiled tubing by a coiled tubing swivel assembly, the coiled tubing swivel assembly comprising:
   a mandrel attached to the pump;
   a hub rotatably attached to the mandrel and further attached to an end of the string of coiled tubing on a coiled tubing reel, wherein the mandrel and the hub together form a fluid conduit for passage of a pumped substance; and
   a slewing ring comprising inner and outer bearing races defining an oblongly arched enclosure to accommodate a spherical bearing, wherein the slewing ring is not in direct physical contact with the mandrel.

2. The assembly of claim 1, wherein the inner race is attached to the hub.

3. The assembly of claim 1, wherein the mandrel is axially aligned with the hub.

4. The assembly of claim 1, wherein the mandrel and the hub each comprise an inner bore, and wherein an inlet to the mandrel inner bore is axially aligned with an outlet to the hub inner bore.

5. The assembly of claim 1, wherein the mandrel comprises a coating that is pre-stressed such that it is in compression when attached to the mandrel.

6. The assembly of claim 1, wherein the slewing ring has a stress bearing capacity sufficient to support stresses imparted thereon by the string of coiled tubing.

7. The assembly of claim 1, wherein the slewing ring has a stress bearing capacity sufficient to support stresses imparted thereon by the string of coiled tubing during a coiled tubing operation.

8. The coiled tubing swivel assembly of claim 1, wherein the mandrel is stationary as the hub rotates.

9. The coiled tubing swivel assembly of claim 8, wherein the mandrel is mounted to the pump.

10. The coiled tubing swivel assembly of claim 9, wherein the hub is mounted to said end of the string of coiled tubing.

11. The coiled tubing swivel assembly of claim 1, wherein the oblongly arched enclosure have four points of contact with the spherical bearing.

12. An oilfield assembly comprising:
   a pump for pumping fluids to a wellbore;
   a string of coiled tubing held by a coiled tubing reel; and
   a coiled tubing swivel assembly comprising:
      a mandrel stationarily mounted to the pump;
      a hub rotatably attached to the mandrel and further attached to an end of the string of coiled tubing, wherein the mandrel and the hub together form a fluid conduit for passage of said fluids; and
      a slewing ring attached to the fluid conduit, wherein the slewing ring comprises oblongly arched bearing races accommodating a bearing, wherein the slewing is not in direct physical contact with the mandrel.

13. The assembly of claim 12, wherein the mandrel and the hub each comprise an inner bore, and wherein an inlet to the mandrel inner bore is axially aligned with an outlet to the hub inner bore.

14. The assembly of claim 12, wherein the mandrel comprises a coating that is pre-stressed such that it is in compression when attached to the mandrel.

15. A method of pumping a fluid into a wellbore comprising:
    providing a pump;
    providing a string of coiled tubing attached to a coiled tubing reel;
    connecting a coiled tubing swivel assembly between said pump and said string of coiled tubing, wherein said connecting comprises:
        mounting a mandrel to the pump, and
        rotatably mounting a hub to the mandrel through a slewing ring of oblongly arched bearing races accommodating a bearing and further mounting the hub to an end of the string of coiled tubing, wherein the mandrel and the hub together form a fluid conduit; and
    operating the pump to pump said fluid into the wellbore, via the fluid conduit and the string of coiled tubing, wherein the slewing ring is not in direct physical contact with the mandrel.

16. The method of claim 15, wherein the slewing ring supports both a pressure load created by said pumping of said fluid, and a reel load created by the weight of the coiled tubing reel.

17. The method of claim 15, further comprising providing a coiled tubing mounting device having a pivotable swing arm to which the swivel assembly is attached.

18. The method of claim 15, wherein the mandrel is axially aligned with the hub, and wherein the mandrel is stationarily mounted to the pump.

19. The method of claim 15, wherein the mandrel comprises a coating that is pre-stressed such that it is in compression when attached to the mandrel.

* * * * *